Sept. 15, 1953 R. D. KIEHL ET AL 2,651,845
ROUNDNESS CHECKING GAUGE
Filed Feb. 18, 1948 3 Sheets-Sheet 1

INVENTORS
Royal R. Kiehl &
Robert C. Wagenhals
By Cau & Cau & Gravely
THEIR ATTORNEYS.

Sept. 15, 1953 R. D. KIEHL ET AL 2,651,845
ROUNDNESS CHECKING GAUGE
Filed Feb. 18, 1948 3 Sheets-Sheet 2

INVENTORS
Royal D. Kiehl &
Robert E. Wogenhals,
By Cann & Cann & Gravely
THEIR ATTORNEYS.

Sept. 15, 1953   R. D. KIEHL ET AL   2,651,845
ROUNDNESS CHECKING GAUGE
Filed Feb. 18, 1948   3 Sheets-Sheet 3

INVENTORS
Royal D. Kiehl, Jr.
Robert E. Wogenknals,
By Carr & Carr & Gravely,
THEIR ATTORNEYS.

Patented Sept. 15, 1953

2,651,845

UNITED STATES PATENT OFFICE 2,651,845

ROUNDNESS CHECKING GAUGE

Royal D. Kiehl and Robert E. Wagenhals, Canton, Ohio, assignors to The Timken Roller Bearing Company, Canton, Ohio, a corporation of Ohio Application February 18, 1948, Serial No. 9,077

5 Claims. (Cl. 33—147)

1

This invention is directed to a mechanism for checking the roundness of machined stock and in its more specific aspects is directed to a gauge for measuring the roundness of anti-friction bearing rollers.

One of the objects of the invention is to produce a roundness gauge provided with a roller or work piece receiving collet for checking the trueness of rollers for anti-friction bearings or other similarly shaped objects as well as a device for quickly chucking and releasing a work piece to be tested.

Another object of the invention is to provide a roundness gauge in which the work piece is held on its true rotating axis while measuring for roundness.

Still another object of the invention is to provide a roundness gauge in which the checking is not affected by a varying number of high points on the periphery of the work piece.

Yet another object of the invention is to provide a roundness gauge in which the collet member is held in definite compression for the purpose of reducing internal deflection of the collet member to assure precision measuring.

Another object is to provide a roundness gauge, not affected by slight variations in the taper of the work piece.

Figure 4:
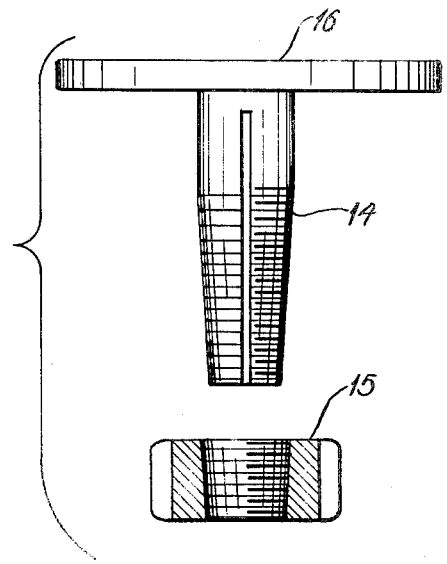
Fig. 4 is an exploded view of the roller gripping wrench.
Figure 1:
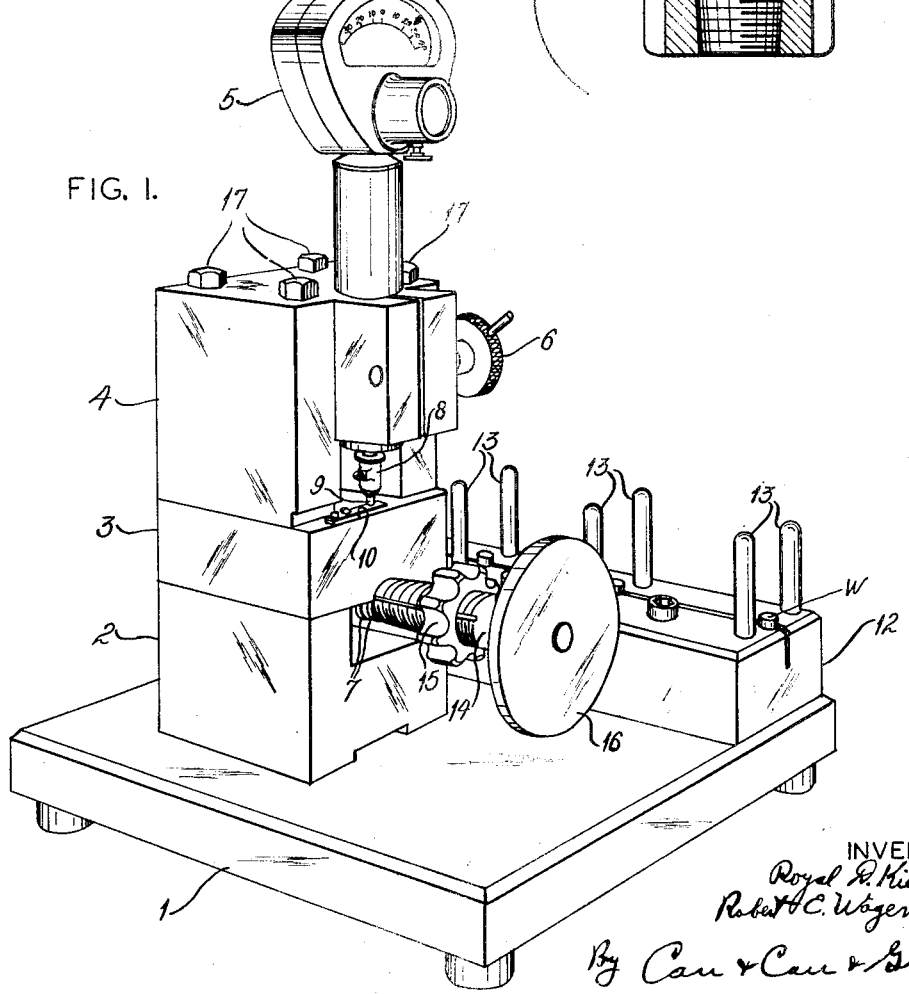
Fig. 1 is a perspective view of the gauge incorporating the invention.

Referring now to the drawings, the numeral 1 designates a base plate for a gauge upon which a suitable work piece receiving collet base or member 2 is mounted. Superimposed on the base 2 is the collet member 3 and superimposed thereupon is a head 4 in which a suitable roundness variation measuring device 5 is removably held. This device is held in place by means of a clamping screw 6 in the customary manner. Base member 2 is secured to base 1 with screws (not shown) extending through from the bottom of base 1. The collet member 3 and the head member 4 are secured to the base member 2 by through screws 17 extending from the top of head member 4, into base member 2, thus placing collet member 3 in definite compression.

2

Formed in member 3 are a bore 6' and collet rings 7, 7 which are suitably ground to receive the work piece being tested. The collet rings 7, 7 are constructed so as to exert radially inward pressure on the work piece or toward the axis thereof, thereby holding it firmly in contact with the conforming wall of the collet so as to compensate for surface irregularities. The rings are split, as shown, so that they will readily receive the rollers and compensate for the slight dimensional variations therein, such as, for example, a slight "off taper" condition which would otherwise affect the accuracy of the reading by allowing one end of the roller to be loose in the collet. In other words, the work pieces or rollers will be so positioned by the collet rings that variations within tolerance limits will produce substantially no effect on the measuring indicator 5.

The contact member 8 of the gauge does not bear directly on the piece tested but there is interposed between said piece and the contact member 8, a rod 9 supported on reeds 10 and 11 suitably secured to the member 3. The terminal extremities of rod 9 are suitably shaped so as to produce the most efficient results.

Figure 2:
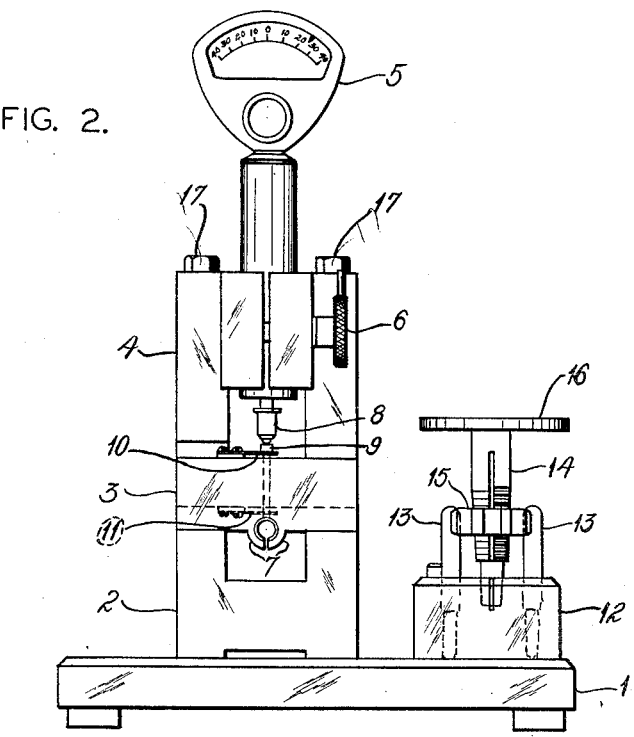
Fig. 2 is a front elevational view of the gauge.
Figure 3:
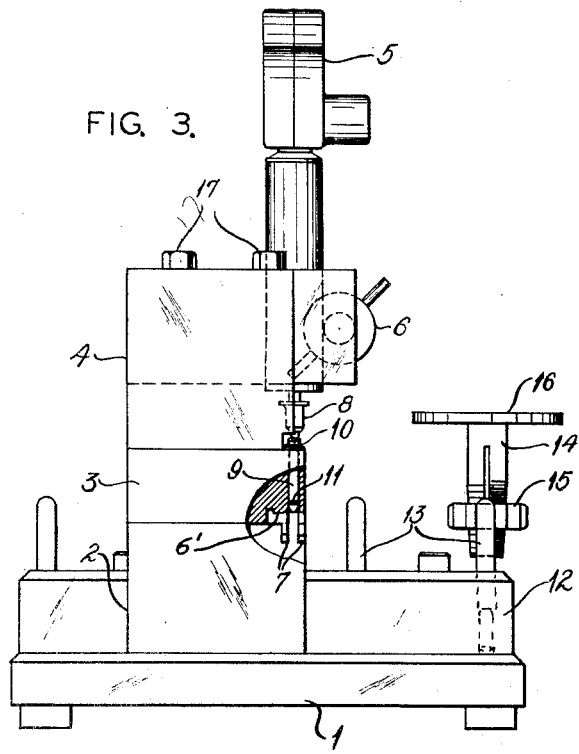
Fig. 3 is a side elevational view thereof.

Means have been provided for quickly and easily introducing a roller to be tested into collet rings 7. This consists of a member 12 suitably secured to the base plate 1. This member has a plurality of pins 13, 13 assembled in suitable apertures provided in the member 12. Each of these pins may be vertically adjusted, if so desired, by suitable screw means, such as indicated by the dotted lines under one of the pins (Figs. 2 and 3). In this particular illustration there are four pairs of pins shown but any number may be provided. The work piece W to be tested is introduced into a cavity disposed midway between the pins of each pair. After this is done a chucking device consisting of a split shanked member 14 is fitted over the end of the roller extending above the member 12. The lower end of the split member is externally threaded and is received in a nut 15 whose exterior has longitudinally extended grooves formed therein. The pins 13, 13 fit into the grooves so that the shank and nut may be easily relatively rotated. The chuck fits over the roller or work piece disposed between pins 13 and as the hand wheel 16 is rotated, the split shank will contract to grip the work piece W. Thereafter the chuck is lifted from between the pins and the work piece introduced into collet rings 7 so that the work piece or roller may be tested by the measuring device 5. Testing is accomplished by rotating the work piece in the collet by turning the chuck through 360° or more with member 16.

Figure 5:
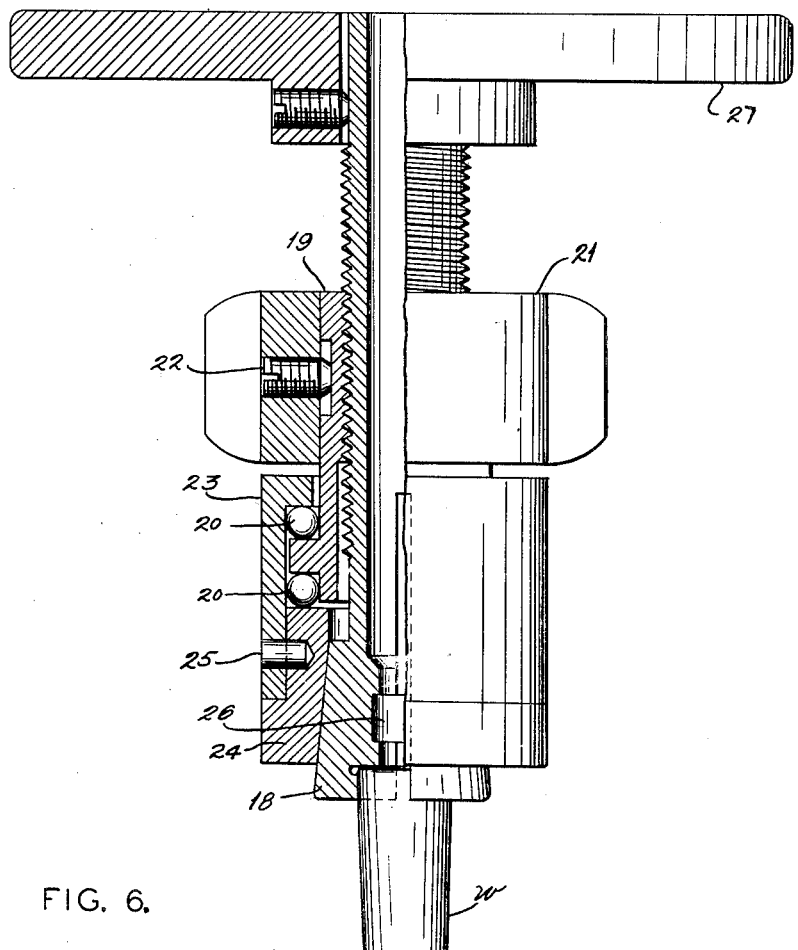
Fig. 5 is an elevational view, partly in section, showing a modified gripping wrench with a chuck construction.

A modified chuck construction is illustrated in Fig. 5. This device comprises a collet 18 whose upper end is threaded and on which a sleeve 19 is threaded, a portion of said sleeve forming raceways for ball thrust bearings 20. A nut 21, whose exterior surface is formed similarly to nut 15, is secured to the upper end of sleeve 19 by a set screw 22. The bearings are enclosed by a sleeve 23 that forms a complemental raceway for ball bearings 20. The lower end of the sleeve has a member 24 secured thereto by pins 25. The bore of member 24 is tapered in the manner shown so as to receive the complementally tapered lower end of collet 18, said tapered end being split to form jaws movable toward and away from each other. A rubber pad 26 is inserted in the collet 18 in a suitable space provided therein to keep the tapered surfaces of the collet 18 jaws and member 24 in continuous engagement. A hand wheel 27 is removably secured to the upper end of collet 18. Rotation of the collet 18 by wheel 27 will axially move the collet relative to the member 24, whereupon the tapered surfaces of member 24 and collet 18 will move axially of each other, thereby causing the collet to clamp or release work piece W, depending upon the direction of rotation of collet 18 relative to nut 21.

Figure 6:
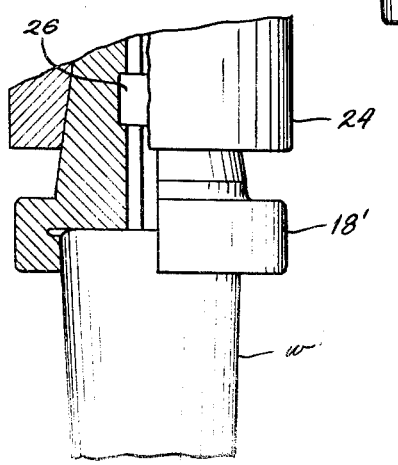
Fig. 6 shows a variation of the Fig. 5 construction.

Fig. 6 illustrates a variation of the Fig. 5 construction showing the collet 18 replaced by collet 18' provided with different sized jaws so that a larger work piece W' may be gripped thereby.

The chucks are installed between pins 13, 13 so that the diametrically opposite peripheral grooves of the nut 21 are engaged thereby to enable the parts of the chuck to be relatively rotated by hand wheel 27, as described above, for the purpose of chucking or unchucking a work piece in the jaws of the collet.

The testing of the work piece is performed in the same manner as set forth above.

What we claim is:

1. A roundness checking gauge for a work piece comprising a collet in which the work piece to be tested is rotatably received including split rings for exerting pressure radially inwardly on the work piece; and reed supported means urged into contact with the work piece for transmitting the movements caused by work piece diameter variations to be imposed on a measuring device.

2. A roundness checking gauge for a work piece comprising a bored member forming a collet for rotatably receiving the work piece; split rings on said member for urging the work piece into contact with the walls of the bore; means disposed at right angles to the axis of said bored member and contactable with the work piece; and reeds for supporting said last mentioned means.

3. A roundness checking gauge for a work piece comprising a member having a bore therein for rotatably receiving the work piece to be tested; resilient rings formed on said member for compensating for dimensional variations in the work piece as it is rotated therein and actuating radially inwardly of said bore; a second member disposed radially of the work piece receiving bore; and a pair of flexible reeds for supporting said second member.

4. A roundness checking gauge for a work piece comprising a frame; a block secured to said frame and provided with a bore for rotatably receiving a work piece; a plurality of resilient rings concentric with said bore and integrally connected to said block that compensate for dimensional variations in the work piece and acting radially inwardly of the bore; a rod slidably received in the frame and engageable with the work piece; and a pair of reeds anchored to said frame for supporting said rod.

5. A roundness checking gauge for a work piece comprising a frame; a member secured to said frame and having a bore therein in which a work piece is rotatably received; resilient rings concentric with said bore and integral with said member for compensating for the roundness variations in a work piece and urging the work piece radially inwardly of said bore; a rod slidably mounted in a bore in said member and disposed at right angles to the axis of said bore, the rod being contactable with the work piece and flexible reed means secured to said frame supporting said rod for axial movement in the bore receiving same.

ROYAL D. KIEHL.
ROBERT E. WAGENHALS.

References Cited in the file of this patent

UNITED STATES PATENTS

| Number | Name | Date |
|---|---|---|
| 299,886 | Westbrook | June 3, 1884 |
| 508,314 | Hill | Nov. 7, 1893 |
| 668,286 | Freese | Feb. 19, 1901 |
| 714,989 | Worthington | Dec. 2, 1902 |
| 1,237,001 | Webber | Aug. 14, 1917 |
| 1,359,943 | Wilhelm | Nov. 23, 1920 |
| 1,473,188 | Kramp et al. | Nov. 6, 1923 |
| 1,529,006 | Bodner | Mar. 10, 1925 |
| 1,637,482 | Graves | Aug. 2, 1927 |
| 1,878,493 | Graham | Sept. 20, 1932 |
| 1,895,928 | Jarvis | Jan. 31, 1933 |
| 1,904,720 | Douglass | Apr. 18, 1933 |
| 1,999,742 | Smith | Apr. 30, 1935 |
| 2,011,931 | Dreyer | Aug. 30, 1935 |
| 2,030,237 | Brittain, Jr., et al. | Feb. 11, 1936 |
| 2,039,224 | Hutchinson | Apr. 28, 1936 |
| 2,104,234 | Linne | Jan. 4, 1938 |
| 2,177,398 | Aller | Oct. 24, 1939 |
| 2,177,399 | Aller | Oct. 24, 1939 |
| 2,331,779 | Hjarpe et al. | Oct. 12, 1943 |
| 2,406,514 | Squire | Aug. 27, 1946 |
| 2,408,689 | Seme | Oct. 1, 1946 |
| 2,490,376 | Rupley | Dec. 6, 1949 |

FOREIGN PATENTS

| Number | Country | Date |
|---|---|---|
| 885,791 | France | June 7, 1943 |

OTHER REFERENCES

Publ.: Pamphlet, "Amplifying Gauge," pages 1 and 3, The North Side Tool Co., Dayton, Ohio, received in Patent Office Jan. 1, 1924. (Copy available in Div. 66, class 33, subclass 147-E.)

Publ.: "Machinery" magazine, January 1926, page 376 (Shaw). (Copy in 33-174Q.)